US005692307A

United States Patent [19]

Whited et al.

[11] Patent Number: 5,692,307

[45] Date of Patent: Dec. 2, 1997

[54] ROTARY KNIFE BLADE

[75] Inventors: Jeffrey A. Whited, Amherst; Robert L. Leimbach, Wakeman; G. Daniel Harper, Collins, all of Ohio

[73] Assignee: Bettcher Industries, Inc., Vermilion, Ohio

[21] Appl. No.: 672,839

[22] Filed: Jun. 28, 1996

[51] Int. Cl.[6] ........ A22C 17/04

[52] U.S. Cl. ........ 30/276; 452/137; 452/149; 30/347; 30/355

[58] Field of Search ........ 30/276, 347, 264, 30/355, 301, 316, 263; 452/132, 133, 137, 149, 164

[56] References Cited

U.S. PATENT DOCUMENTS

| | | | |
|---|---|---|---|
| 412,100 | 10/1889 | Knapp | 30/316 |
| 773,118 | 10/1904 | Carter . | |
| 2,171,604 | 9/1939 | Segal . | |
| 2,531,841 | 11/1950 | Cashin . | |
| 3,176,397 | 4/1965 | Schuhmann | 30/347 |
| 3,308,703 | 3/1967 | Sauer . | |
| 3,346,956 | 10/1967 | Wezel et al. | 30/355 |
| 3,496,618 | 2/1970 | Como . | |
| 4,027,390 | 6/1977 | Kendzior . | |
| 4,250,622 | 2/1981 | Houle . | |
| 4,575,938 | 3/1986 | McCullough | 30/276 |
| 4,637,140 | 1/1987 | Bettcher | 30/276 |
| 4,854,046 | 8/1989 | Decker et al. | 30/264 |
| 4,891,885 | 1/1990 | Fischer et al. | 30/355 |
| 4,899,742 | 2/1990 | Muller . | |
| 5,254,031 | 10/1993 | Balke . | |
| 5,445,561 | 8/1995 | Elmer . | |

*Primary Examiner*—Hwei-Siu Payer
*Attorney, Agent, or Firm*—Watts, Hoffmann, Fisher & Heinke CO., L.P.A.

[57] ABSTRACT

A rotary knife blade comprising an annular body rotatable about a central axis, gear teeth projecting away from the body to form a ring gear, and an annular blade section projecting away from the body. The blade section comprises a first frustoconical, radially inner surface, a second frustoconical, radially outer surface, a third annular surface extending between the first and second surfaces remote from the body and an array of shallow flutes formed in the blade section. The flutes are disposed circumferentially about the blade section, extending from the projecting blade section end toward the body and opening in the first and third surfaces. The junctures of the third surface with the first surface and the flutes define a cutting edge.

20 Claims, 3 Drawing Sheets

Fig.3
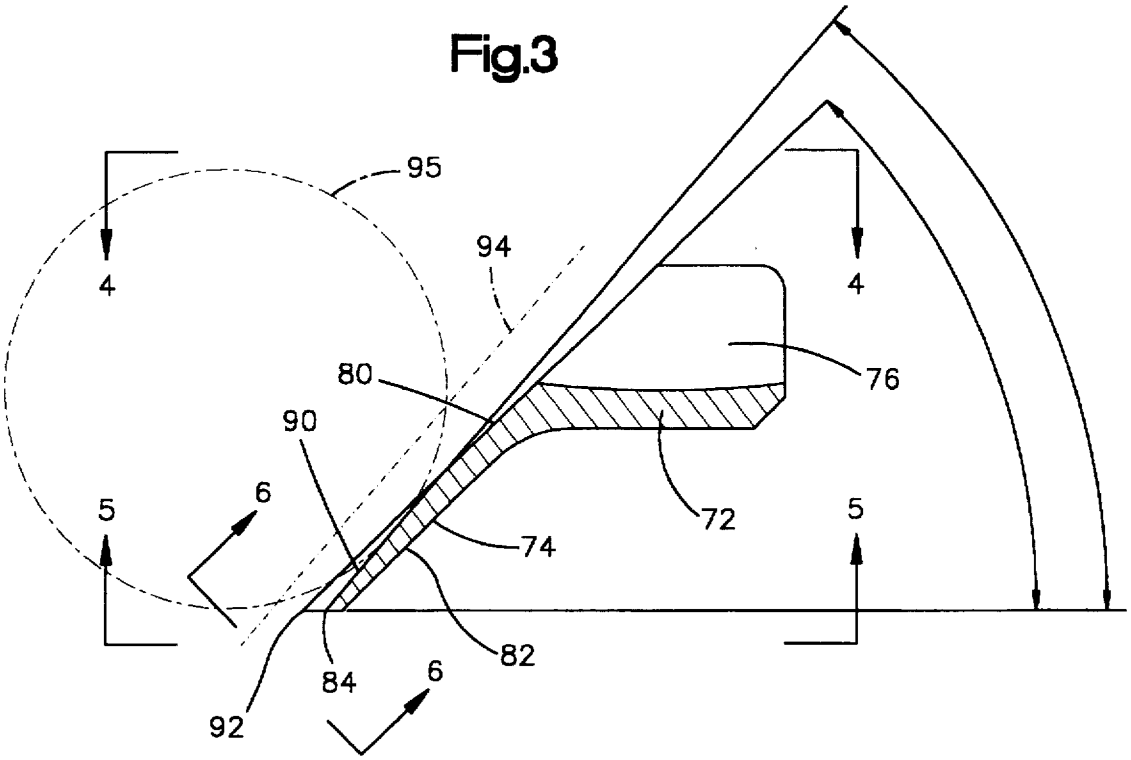
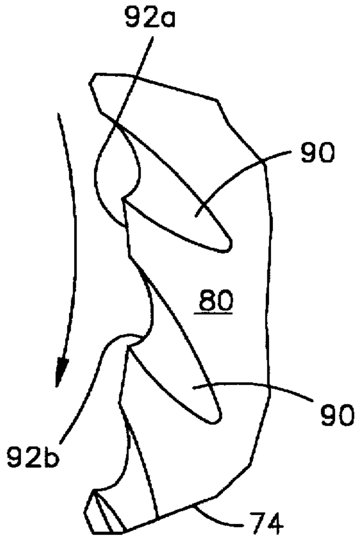
Fig.4
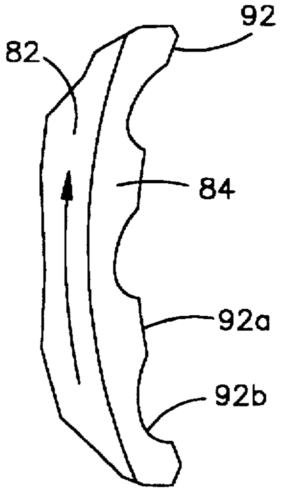
Fig.5
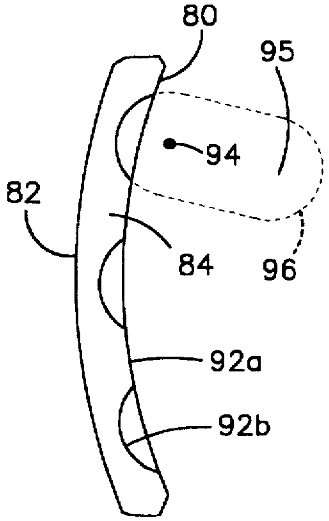
Fig.6

ROTARY KNIFE BLADE

FIELD OF THE INVENTION

The present invention relates to power operated rotary knives and more particularly to a power operated rotary knife having a fluted blade.

BACKGROUND OF THE INVENTION

Power operated rotary knives have been in wide spread use for meat cutting in meat packing and commercial food service facilities. These knives have usually comprised a handle and an annular blade holder for respectively housing a motor and a rotary knife blade. The knife blade was annular and driven about a central axis by the motor via a gear train.

The knife blade comprised a body carried by the blade holder and a blade section projecting from the blade holder. The blade body was a continuous ring received by a circular slot in the blade holder. Gear teeth projected away from the blade body to form a ring gear running in mesh with a drive gear connected to the drive motor. The knife blade sections were usually frusto-conical and had a circular blade edge formed by the intersection of smooth, machined blade section surfaces.

The present invention provides a new and improved rotary knife blade having a fluted periphery and so constructed and arranged that operator effort required for cutting meat and similar materials is reduced, the blade drive motor loads created by cutting are minimized and the blade remains sharper longer.

SUMMARY OF THE INVENTION

The present invention provides a rotary knife blade comprising an annular body rotatable about a central axis and an annular blade section projecting away from the body. The blade section comprises a first radially inner surface, a second radially outer surface, one surface terminating in a cutting edge remote from the body, and, an array of shallow flutes formed in the one surface. The flutes are disposed circumferentially about the blade section, extending from the edge toward the body.

In a preferred embodiment of the invention the first and second surfaces are frustoconical and a third annular surface extends between them remote from the body. The flutes are formed in the first surface and open in the first and third surfaces. The junctures of the third surface with the first surface and the flutes define a cutting edge.

Other features and advantages of the invention will become apparent from the following description of a preferred embodiment made in reference to the accompanying drawings, which form a part of the specification.

BRIEF DESCRIPTION OF THE DRAWINGS

FIG. 3 is an enlarged fragmentary cross sectional view of part of the knife blade shown in FIG. 1 seen approximately from the plane indicated by the line 3—3 of FIG. 1;

FIG. 4 is a view seen approximately from the plane indicated by the line 4—4 of FIG. 3;

FIG. 5 is a view seen approximately from the plane indicated by the line 5—5 of FIG. 3;

FIG. 6 is a view seen approximately from the plane indicated by the line 6—6 of FIG. 3;

DESCRIPTION OF THE BEST KNOWN MODE FOR PRACTICING THE INVENTION

Figure 1:
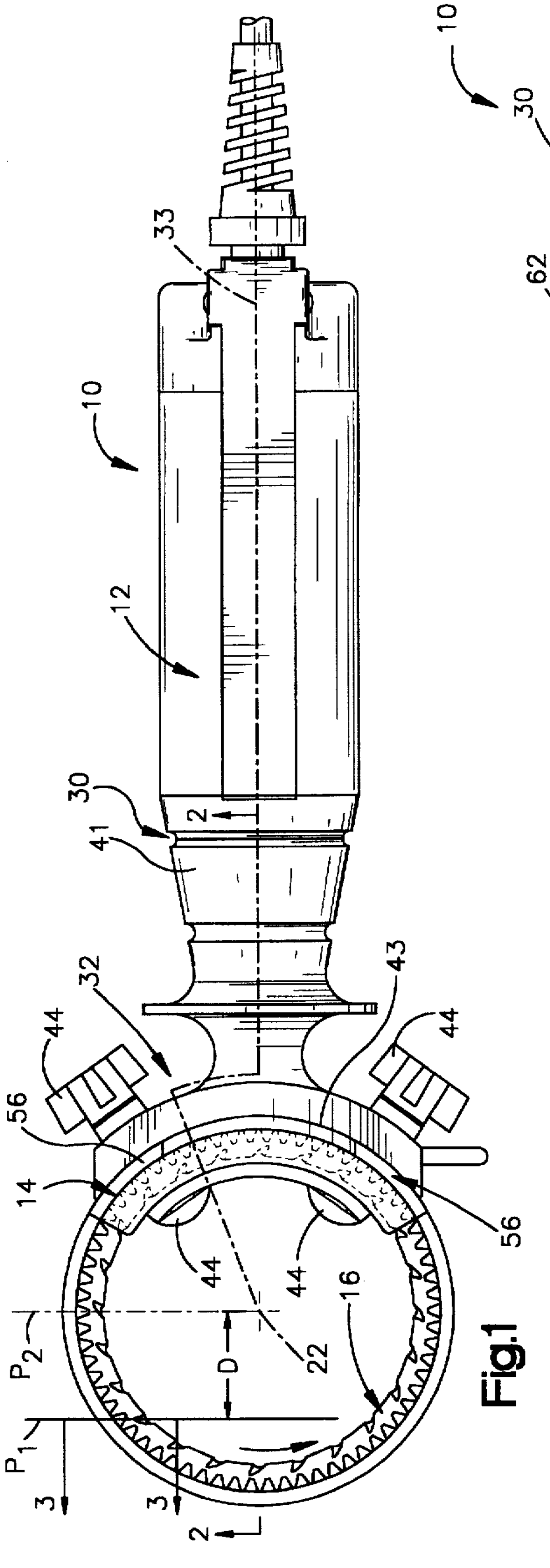
FIG. 1 is a top plan view of a hand knife incorporating a blade constructed according to the invention.
Figure 2:
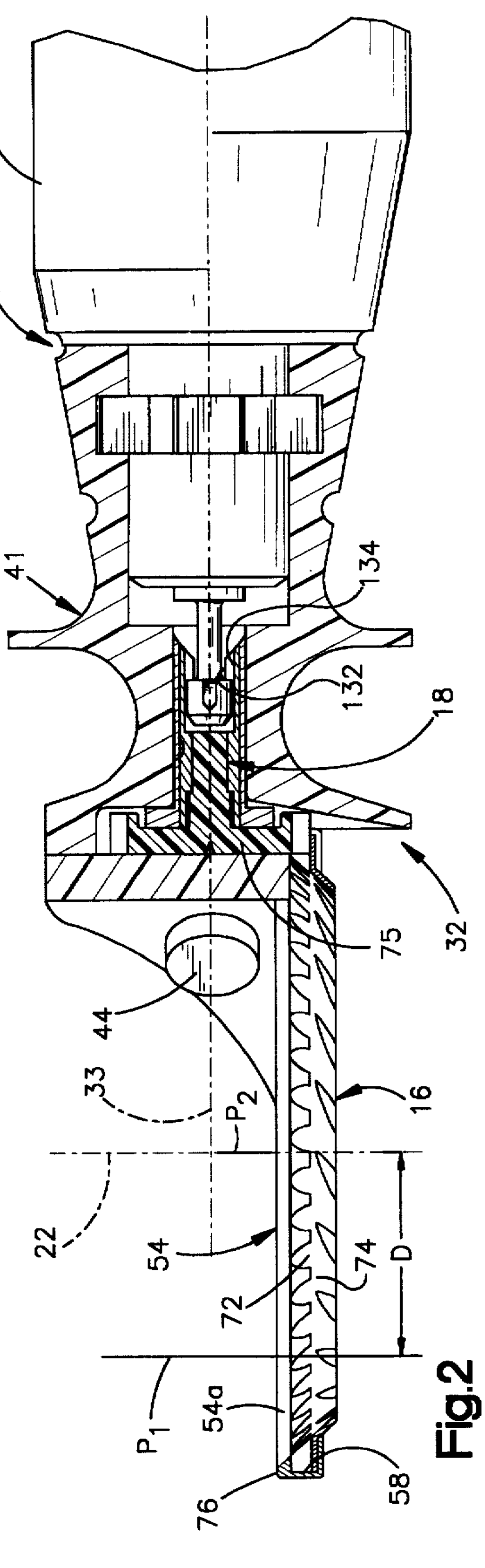
FIG. 2 is an enlarged fragmentary view seen approximately from the plane indicated by the line 2—2 of FIG. 1.

A rotary hand knife 10 incorporating a blade consructed according to the invention is illustrated in FIG. 1 of the drawings as comprising a handle assembly 12, a ring-like blade housing 14 carried by and projecting from the handle assembly, a ring blade 16 carried by the housing 14, and a blade drive transmission 18 (FIG. 2). The blade housing 14 and blade 16 are disposed about a central axis 22. The blade 16 is driven about the axis relative to the blade housing 14 by the drive transmission 18.

The knife 10 is of a type used in meat packing factories, or the like, for trimming and boning carcasses. The knife 10 is grasped by an attendant and turned "on" so that the blade 16 is driven. The attendant works the knife along a carcass to trim or bone it. The knife 10 is shown for illustrative purposes since the invention can be embodied in rotary knives adapted for other tasks.

The illustrated knife is operated by an electric motor (not illustrated) housed in the handle assembly 12 and connected to a suitable power supply. While an electric motor driven knife is illustrated, it should be appreciated that other kinds of drives may be employed, for example, a remote electric motor or air motor with a flexible drive shaft extending to the knife; a handle mounted air motor with pressurized air supplied through a flexible hose, etc.

The handle assembly 12 houses the blade drive transmission 18, serves as a support for the remaining knife components and provides a comfortable hand piece for the attendant. The preferred handle assembly 12 comprises a manually grippable handle 30 and a head piece 32 for securing the blade housing and blade to the handle assembly.

The illustrated handle 30 is an elongated element shaped so that it can be manually gripped for manipulating the knife over an extended period of time with the knife operator experiencing minimum discomfort or fatigue. In the illustrated knife the handle 30 is generally cylindrical, tubular and projects from the head piece 32 along a longitudinal axis 33. The blade driving motor is mounted in the tubular handle 30.

The head piece 32 anchors the blade housing 14 and blade 16 to the handle assembly. The illustrated head piece comprises a blade housing seat assembly and a shank 41 extending from the seat assembly to the handle 30. The shank 41 defines a socket-like open end for receiving the handle 30. A bayonet type coupling is formed by the shank socket and the projecting handle end so that the two are detachably connectable. The seat assembly comprises a semicircular blade housing seat 43 and connectors 44 for securing the blade housing 14 to the seat. In the illustrated knife, two connectors, each formed by a nut and bolt assembly extending through holes in the seat 43 and blade housing, securely clamp the blade housing to the seat.

The blade housing 14 firmly supports the blade 16 against forces applied during the meat trimming operations yet insures low friction blade rotation about the axis 22 and facilitates easy blade removal and replacement. The blade housing 14 comprises a thin circularly curved blade support 54 (FIG. 2) projecting away from the handle assembly 12 in a plane normal to the axis 22 and a semi-cylindrical, split base 56 extending axially from a portion of the blade support periphery for securing the blade housing to the head piece. The blade housing 14 is clamped against the seat 43 by the connectors 44, which extend through holes in the base 56 and the seat 43. The seat 43 defines locating ribs (not illustrated) extending respective conforming grooves in the base 56 when the base is properly positioned on the seat.

The blade support 54 expands to enable easy blade removal and replacement when the split is enlarged. The blade support 54 has a radially inwardly facing side 54*a* and defines a blade-receiving groove 58 opening radially inwardly in the side 54*a* and extending substantially completely about the blade support 54. The blade is inserted in, and removed from, the support 54 by sliding it into and out of the groove 58 when the blade housing split ends are manually separated and held apart. The groove 58 has a generally rectilinear cross sectional shape with the blade support 54 defining a generally "U" shaped cross section. The groove 58 supports the ring blade 16 somewhat loosely with little friction.

The ring blade 16 is driven about its central axis 22 by the motor via the drive transmission 18 so that as the knife moves through the meat the blade readily slices it. The ring blade comprises an annular body 72 disposed about the central axis 22 and an annular blade section 74 projecting from the body. In the illustrated embodiment of the invention (FIG. 2) the transmission 18 comprises spur gear 75 rotatably supported by the head piece, and a ring gear defined by a plurality of gear teeth 76 projecting away from the body 72 in the direction of extent of the axis 22. The spur gear rotates about the axis 33 disposed normal to the axis 22 and meshes with the ring gear so that when the motor operates, the spur gear 75 drives the ring gear about the axis 22. While the ring gear is illustrated as formed continuously with the ring blade body 72, the ring gear can be formed from a separate member and fixed to the ring blade.

The blade section 74 is so constructed and arranged that it slices through the meat with great efficiency, minimizing both operator effort and the frictional forces resisting slicing while maximizing the time between blade sharpenings. Referring to FIGS. 3–6, the blade section 74 comprises a first, radially inner surface 80, a second, radially outer surface 82, a third surface 84 extending between the first and second surfaces remote from the body and a plurality of flutes 90 formed in one of the first and second blade section surfaces.

The illustrated blade section 74 projects axially from the blade support 54 and radially inwardly toward the axis 22. The inner and outer surfaces 80, 82 are concentric about the axis 22, frustoconical and extend parallel to each other from the body 72. The blade section 74 thus forms a thin frustoconical wall projecting from the blade body. The surface 84 is disposed in a plane that is normal to the axis 22. The surfaces 80 and 84 intersect at an acute angle with their intersections forming part of a blade cutting edge 92.

The flutes 90 are spaced circumferentially about the blade section and extend from the projecting blade section end toward the body 72. In the preferred embodiment of the invention the flutes are defined by smoothly arcuate depressions in the surface 80. The flutes have their maximum depths at their intersections with the surface 84 and become progressively shallower proceeding away from the surface

84. The illustrated flutes open in the surfaces 80, 84. The blade cutting edge 92 is defined by the junctures of the surface 84 with the surface 80 and with the flutes 90. Because the flutes are spaced circumferentially apart, the cutting edge 92 is formed by alternating cutting edge segments 92*a*, 92*b*. The edge segments 92*a* are defined by intersections of the surfaces 80, 84 and form circularly curved arc segments centered on the axis 22. The edge segments 92*b* are formed by the intersections of the surface 84 and the flutes 90 and form arcuate edge segments having continuously varying radii of curvature. See FIGS. 4 and 5.

In the preferred embodiment of the invention each flute 90 is cylindrically curved about an individual longitudinal flute axis 94 (FIG. 3). Each flute axis 94 is skewed with respect to the blade axis 22. In the illustrated knife, each flute axis 94 lies in a plane that is parallel to, and spaced a predetermined distance from, a plane containing the axis 22 and a radial line through the ring blade. One such flute axis plane is illustrated by the line segments P1 in FIGS. 1 and 2. The associated plane containing the axis 22 and the radial line is illustrated by the line segments P2 in FIGS. 1 and 2. The predetermined offset distance between the planes P1, P2 is indicated by the reference character D.

Each flute axis 94 also inclines relative to the axis 22 and the inner blade surface 80 with which it is aligned so that the intersection of the inner surface 80 and the flute forms a canted parabola when viewed in elevation (as in FIGS. 1, 2 and 4). The flutes 90 are preferably formed by a relatively small diameter grinding wheel 95 having a toroidally curved outer periphery 96 (see FIG. 6). The grinding wheel 95 is driven to rotate and move relative to the surface 80, with the center of curvature of the grinding wheel periphery 96 forming the flute axis 94. The grinding wheel 96 creates a grinding pattern extending transverse to the edge 92. The flutes can be formed by other operations if desired. For example, the flutes can be formed by a cylindrical rotating grinding rod, oriented with its axis (the flute axis 94) slightly inclined with respect to the surface 80.

The cylindrical cut made in the face 80 is relatively deep at the projecting blade section end. For example, assuming the ring blade axis 22 is vertical and the blade section wall thickness is about 0.5 mm inches, if the inner surface 80 defines an angle of 45° from vertical at its intersection with the flute axis plane P1 then the flute axis may be inclined a few degrees less than 45° to leave a minimum wall thickness of about 0.2 mm at the projecting blade end.

Each cutting edge segment 92*b* presents a continuously varying radius of curvature proceeding from one edge segment 92*a* to the next succeeding edge segment 92*a* (FIG. 5). The radii of curvature of the segments 92*b* are all smaller than the radius of curvature of the segments 92*a*. In the preferred blade the radius of curvature of the edge segments 92*b* continuously decreases proceeding from one segment 92*a* to the next in the direction of blade rotation. Because the flutes 90 are cut at a skew angle into the conical blade surface, the attack angle of each edge segment 92*b* varies continuously proceeding along each edge segment 92*b*. That is to say, when the knife 10 moves in a straight line while cutting a body of meat, each edge segment 92*b* bites into the meat at an angle that varies proceeding along the segment. Each intervening segment 92*a*, on the other hand, bites into the meat at an angle that is constant proceeding along the segment.

It should be noted that the new ring blade can be sharpened in the same manner conventional blades are sharpened. The planar surface 84 is run on an abrasive sharpener surface and a steel is held against the frustoconical inner surface 80 in the usual manner to deburr the edge.

Figure 7:
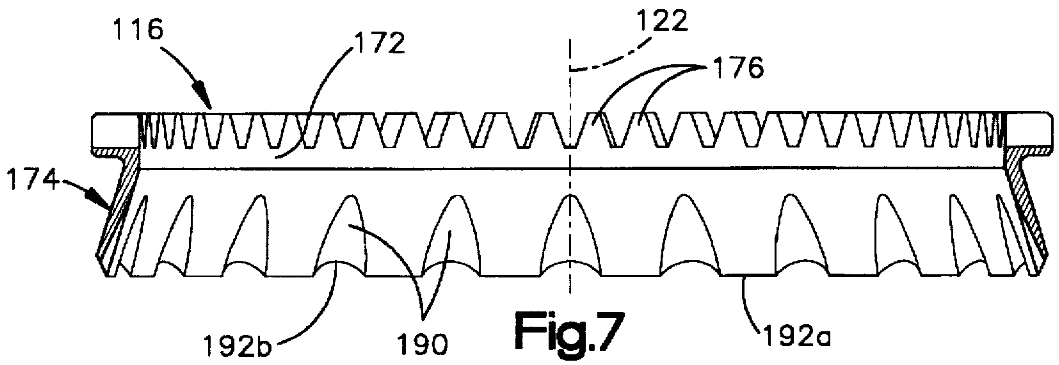
FIG. 7 is a cross sectional view of a modified knife blade constructed according to the present invention.
Figure 8:
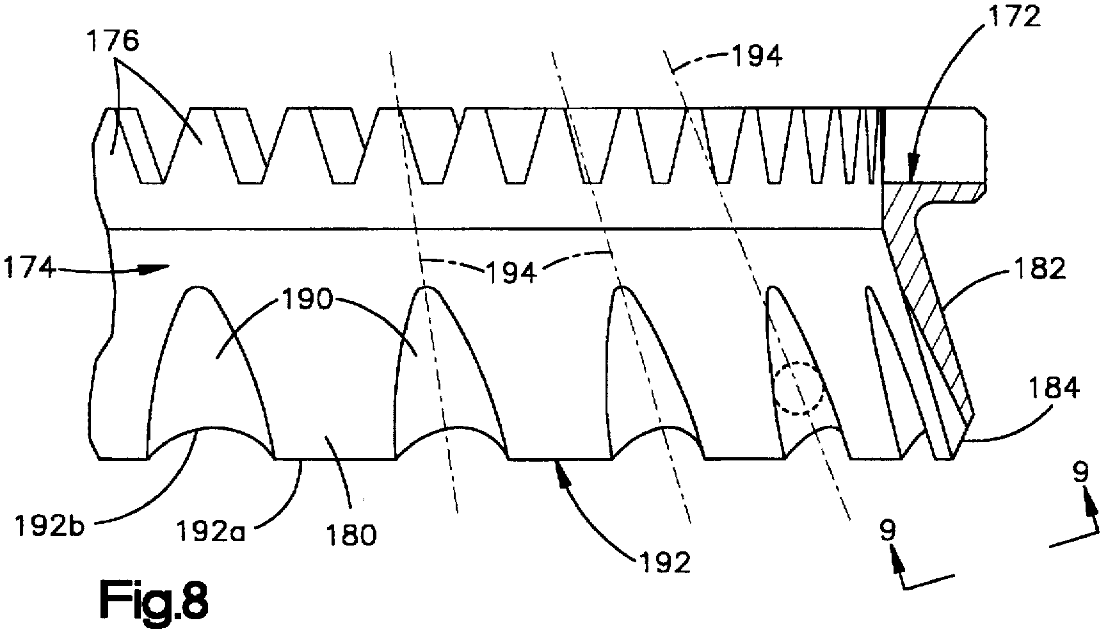
FIG. 8 is an enlarged fragmentary view of part of the blade of FIG. 7.
Figure 9:
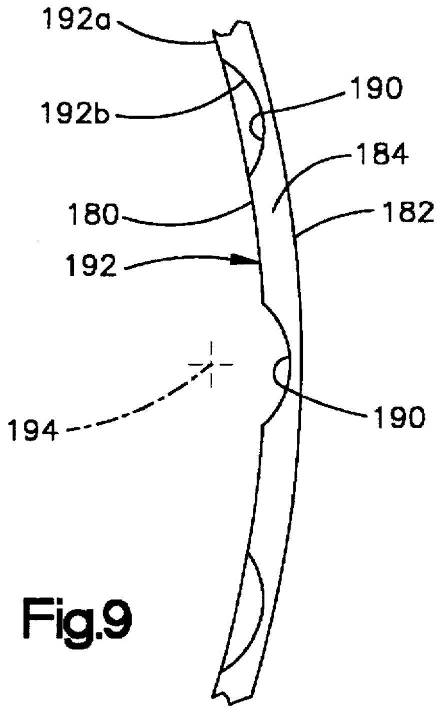
FIG. 9 is a view seen approximately from the plane indicated by the line 9—9 of FIG. 8.

FIGS. 7–9 feature a modified ring blade 116 constructed according to the invention. The ring blade 116 is constructed for use with a hand knife such as that illustrated in U.S. Pat. No. 4,509,261, for example. As shown in the Figures, the blade 116 comprises an annular body 172 disposed about a central axis 122 and an annular blade section 174 projecting from the body 172. In the illustrated embodiment of the invention the body 172 defines a plurality of gear teeth 176 projecting axially away from the body to form a ring gear so that when the knife motor operates, the ring gear is driven about the axis 122.

The blade section 174 is so constructed and arranged that it slices through the meat with great efficiency, minimizing both operator effort and the frictional forces resisting slicing while maximizing the time between blade sharpenings. Referring to FIGS. 7–9, the blade section 174 comprises a first, radially inner surface 180, a second, radially outer surface 182, a third surface 184 extending between the first and second surfaces remote from the body and a plurality of flutes 190 formed in one of the first and second blade section surfaces.

The illustrated blade section 174 projects axially from the body 172 and radially outwardly away from the axis 122. The inner and outer surfaces 180, 182 are concentric about the axis 122, frustoconical and extend parallel to each other from the body 172. The blade section 174 thus forms a thin frustoconical wall projecting from the blade body. The surface 184 is frustoconical and converges in a direction proceeding away from the body 172 so that the surfaces 180 and 184 intersect at an acute angle with their intersections forming part of a blade cutting edge 192.

The flutes 190 are spaced circumferentially about the blade section and extend from the projecting blade section end toward the body 172. In the preferred embodiment of the invention the flutes are defined by smoothly arcuate depressions in the surface 180. The flutes have their maximum depths at their intersections with the surface 184. The illustrated flutes open in the surfaces 180, 184. The blade cutting edge 192 is defined by the junctures of the surface 184 with the surface 180 and with the flutes 190. Because the flutes are spaced circumferentially apart, the cutting edge 192 is formed by alternating cutting edge segments **192*a*, 192*b*. The edge segments 192*a* are defined by intersections of the surfaces 180, 184. Each edge segment 192*a* is circularly curved about the axis 122**.

In the preferred embodiment of the invention each flute 190 is cylindrically curved about an individual longitudinal flute axis 194. In the illustrated embodiment each flute axis lies in a plane containing the axis 122 and extending radially from the axis 122 through the ring blade. The flute axes 194 preferably extend axially and radially relative to the axis 122 (rather than at skew angles relative to the axis as in the blade of FIGS. 1–6) and all the axes intersect at about the same point. The edge segments **192*b* are formed by the intersections of the surface 184 and the flutes 190 and form arcuately curved edge segments having radii of curvature substantially smaller than the radius of curvature of the edge segments 192*a*. See FIGS. 8 and 9. Because the flute axes are disposed in respective radial planes the radii of curvature of all the blade edge segments 192*b*** are the same.

The preferred ring blade 116 is provided with flutes 190 formed by rotating cylindrical grinding rods. The grinding rod is driven and rotates about its longitudinal axis as it is advanced into the blade surface 180. Grinding continues until the grinding rod axis and the flute axis 194 coextend. Although grinding rods are preferred, the flutes 190 may be formed using other methods.

While a two embodiments of the invention have been illustrated and described in considerable detail, the present invention is not to be considered limited to the precise constructions disclosed. Various adaptations, modifications and uses of the invention may occur to those skilled in the art to which the invention relates. It is the intention to cover all such adaptations, modifications and uses falling within the scope or spirit of the annexed claims.

Having described my invention I claim:

1. A rotary knife blade comprising:

an annular body having a central axis about which the body is rotatable;

an annular blade section projecting from said body, said blade section comprising;

a first, frustoconical radially inner surface;

a second, frustoconical radially outer surface;

a third annular surface extending between said first and second surfaces remote from said body;

a cutting edge defined by the juncture of said third surface with one of said first and second surfaces; and, a plurality of flutes formed in said blade section, said flutes disposed circumferentially about said blade section, extending from the projecting end of said blade section toward said body and opening in the third surface and said one of said first and second surfaces.

2. The blade claimed in claim 1 wherein said flutes are spaced circumferentially apart and said cutting edge is formed in part by a series of edge segments defined by the intersection of said first and third surfaces.

3. The blade claimed in claim 1 further comprising gear teeth by which said body is rotated about said axis and wherein said gear teeth are formed continuously with said body.

4. The blade claimed in claim 1 wherein said cutting edge is generally sinuously shaped and has a series of edge segments circularly curved about said central axis and a series of intervening arcuate edge segments having smaller radii of curvature.

5. The blade claimed in claim 4 wherein said intervening edge segments define radii of curvature that increase proceeding from one end of each such edge segment to the other.

6. The blade claimed in claim 1 wherein each of said flutes defines a surface curving about a longitudinal flute axis.

7. The blade claimed in claim 6 wherein the longitudinal flute axis is skewed with respect to the central axis.

8. The blade claimed in claim 1 wherein each flute is defined by a smoothly arcuate depression in said first frustoconical surface, said depression having a maximum depth at its intersection with said third surface and becoming progressively shallower proceeding away from said intersection.

9. A rotary knife blade comprising:

an annular body having a central axis about which the body is rotatable;

an annular blade section projecting from said body, said blade section comprising;

a first radially inner surface;

a second radially outer surface;

flutes formed in said first surface, said flutes disposed circumferentially about said blade section, extending from the projecting end of said blade section toward said body; and, a cutting edge defined along the projecting end of said blade section.

10. A rotary knife blade comprising:

an annular body having a central axis about which the body is rotatable;

an annular blade section projecting from said body, said blade section comprising;

a first radially inner surface;

a second radially outer surface;

one of said first and second surfaces terminating in a cutting edge remote from said body; and, an array of shallow flutes formed in said one surface, said flutes disposed circumferentially about said blade section, extending from said edge toward said body.

11. A rotary knife blade comprising:

an annular body having a central axis about which the body is rotatable; and, an annular blade section projecting generally axially from said body, said blade section comprising;

a first radially inner face;

a second radially outer face; and, a cutting edge defined along the projecting end of said blade section and extending about said central axis;

said cutting edge generally sinuously shaped and comprising cutting edge segments having differing radii of curvature.

12. The rotary knife blade claimed in claim 11 further comprising a third face extending between said first and second faces, said cutting edge defined at least in part by the intersection of said third face and one of said first and second faces.

13. The rotary knife blade claimed in claim 12 wherein said third face is disposed in a plane.

14. The rotary knife blade claimed in claim 13 wherein said cutting edge is disposed in said plane and defined by the intersection of said first and third faces.

15. The rotary knife blade claimed in claim 12 wherein said third face is generally frustoconical in shape.

16. The rotary knife blade claimed in claim 15 wherein said one of said first and second faces further comprises a series of flutes spaced about said central axis and extending from said cutting edge toward said annular body.

17. The rotary knife blade claimed in claim 16 wherein said cutting edge is defined in part by the intersection of said flutes and said third face.

18. The rotary knife blade claimed in claim 11 wherein said first inner face and said second outer face are frustoconical.

19. The rotary knife blade claimed in claim 11 wherein at least some of said cutting edge segments have radii of curvature that vary continuously.

20. The rotary knife blade claimed in claim 11 wherein said sinuous cutting edge is disposed in a plane normal to said central axis.

* * * * *